(12) United States Patent
Masao et al.

(10) Patent No.: US 8,398,884 B2
(45) Date of Patent: Mar. 19, 2013

(54) METHOD FOR PRODUCING ELECTRODE MATERIAL FOR FUEL CELL, ELECTRODE MATERIAL FOR FUEL CELL, AND FUEL CELL USING THE ELECTRODE MATERIAL FOR FUEL CELL

(75) Inventors: Akihiro Masao, Ehime (JP); Zhiyun Noda, Fukuoka (JP); Fumiaki Takasaki, Fukuoka (JP); Kohei Ito, Fukuoka (JP); Kazunari Sasaki, Fukuoka (JP)

(73) Assignee: Kyushu University, National University Corporation, Fukuoka (JP)

( * ) Notice: Subject to any disclaimer, the term of this patent is extended or adjusted under 35 U.S.C. 154(b) by 315 days.

(21) Appl. No.: 12/734,219

(22) PCT Filed: Oct. 31, 2008

(86) PCT No.: PCT/JP2008/003155
§ 371 (c)(1),
(2), (4) Date: Apr. 19, 2010

(87) PCT Pub. No.: WO2009/060582
PCT Pub. Date: May 14, 2009

(65) Prior Publication Data
US 2010/0233574 A1 Sep. 16, 2010

(30) Foreign Application Priority Data
Nov. 9, 2007 (JP) ................................. 2007-291809

(51) Int. Cl.
*H01M 4/88* (2006.01)
(52) U.S. Cl. ..................... 252/182.1; 252/500; 429/487; 502/329

(58) Field of Classification Search .............. 252/182.1, 252/500; 429/44, 487; 502/329
See application file for complete search history.

(56) References Cited

U.S. PATENT DOCUMENTS
(Continued)

FOREIGN PATENT DOCUMENTS
| EP | 0 311 084 | 4/1989 |
| JP | 2004-363056 | 12/2004 |

(Continued)

OTHER PUBLICATIONS

International Search Report issued Feb. 10, 2009 in International (PCT) Application No. PCT/JP2008/003155.

(Continued)

*Primary Examiner* — Khanh Tuan Nguyen
(74) *Attorney, Agent, or Firm* — Wenderoth, Lind & Ponack, L.L.P.

(57) ABSTRACT

Disclosed is a method for producing an electrode material for fuel cells, which electrode material has excellent electrochemical catalytic activity and uses a non-carbon conductive oxide carrier having high durability. Specifically disclosed is a method for producing an electrode material for fuel cells, which comprises the following steps. (1) A step wherein carriers mainly composed of tin oxide are dispersed in a solution containing a noble metal colloid, and the noble metal colloid is reduced so that the carriers are loaded with noble metal particles (2) A step wherein the carriers loaded with the noble metal particles are separated from the liquid and dried (3) A step wherein the dried carriers loaded with the noble metal particles are subjected to a heat treatment at a temperature of not less than 80° C. but not more than 250° C. in the presence of a reducing gas.

7 Claims, 11 Drawing Sheets

U.S. PATENT DOCUMENTS

| | | | |
|---|---|---|---|
| 4,431,750 A * | 2/1984 | McGinnis et al. | 502/329 |
| 4,830,844 A | 5/1989 | Kolts | |
| 5,876,633 A | 3/1999 | Coleman | |
| 5,876,634 A | 3/1999 | Coleman | |
| 5,891,511 A | 4/1999 | Coleman et al. | |
| 6,084,701 A | 7/2000 | Coleman | |
| 6,165,388 A | 12/2000 | Coleman | |
| 7,579,298 B2 | 8/2009 | Mei et al. | |
| 2005/0084740 A1 | 4/2005 | Lyons et al. | |
| 2007/0087258 A1 | 4/2007 | Mei et al. | |
| 2008/0241642 A1 * | 10/2008 | Iordache et al. | 429/44 |
| 2008/0280753 A1 | 11/2008 | Watanabe et al. | |

FOREIGN PATENT DOCUMENTS

| | | |
|---|---|---|
| JP | 2005-34779 | 2/2005 |
| JP | 2005-87993 | 4/2005 |
| JP | 2005-149742 | 6/2005 |
| JP | 2005-270864 | 10/2005 |
| JP | 2007-111582 | 5/2007 |
| JP | 2007-141624 | 6/2007 |
| JP | 2007-165205 | 6/2007 |
| JP | 2008-97874 | 4/2008 |
| WO | 97/23578 | 7/1997 |
| WO | 98/13438 | 4/1998 |
| WO | 2006/038676 | 4/2006 |

OTHER PUBLICATIONS

Roen, L. M. et al., *Electrocatalytic Corrosion of Carbon Support in PEMFC Cathodes, Electrochemical and Solid-State Letters*, vol. 7, No. 1 (2004), pp. A19-A22.

Supplementary European Search Report mailed Oct. 23, 2012 in corresponding European Application No. 08 84 7709.

* cited by examiner

METHOD FOR PRODUCING ELECTRODE MATERIAL FOR FUEL CELL, ELECTRODE MATERIAL FOR FUEL CELL, AND FUEL CELL USING THE ELECTRODE MATERIAL FOR FUEL CELL

BACKGROUND OF THE INVENTION

1. Field of the Invention

The invention relates to a method of producing a material of which a fuel cell electrode preferably used as an electrode (in particular, a cathode) for a polymer electrolyte fuel cell is composed. The invention relates more particularly to a method of producing a material of which an electrode used for a fuel cell is composed, the material including non-carbon electrically conductive oxide supports as electron-conductive supports.

2. Description of the Related Art

Since a fuel cell is able to effectively convert chemical energy of hydrogen into electric energy, it is expected that an electric power generation system making use of a fuel cell is broadly used. Among fuel cells, a polymer electrolyte fuel cell (PEFC) including a solid polymer membrane as a membrane electorolyte is able to work at a relatively low temperature, specifically, at about 80 degrees centigrade, and hence, is expected to be used as a small-sized fuel cell for houses, for instance.

PEFC comprises an anode (a fuel electrode) attached to one of surfaces of a solid polymer membrane electorolyte, and a cathode (an air electrode) attached to the other. Supplying hydrogen as fuel to the anode, and air (oxygen) to the cathode, electric power is generated in accordance with the following electrochemical reactions.

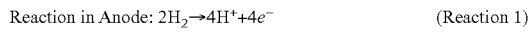

Reaction in Anode: $2H_2 \rightarrow 4H^+ + 4e^-$ (Reaction 1)

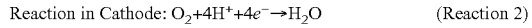

Reaction in Cathode: $O_2 + 4H^+ + 4e^- \rightarrow H_2O$ (Reaction 2)

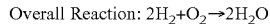

Overall Reaction: $2H_2 + O_2 \rightarrow 2H_2O$

As a material of which an electrode used for PEFC is composed, presently broadly used are a material comprising particles of noble metal such as platinum (Pt) and Ruthenium (Ru), and a particle-shaped or fiber-shaped carbon material on which the nobel metal particles are dispersed (for instance, see Japanese Patent Application Publication No. 2005-87993 and Japanese Patent No. 368364). The noble metal particles provide electrochemical catalytic activities, specifically, reduction of oxygen (and oxidation of hydrogen), and the carbon material works as supports for loading the noble metal particles thereon. Furthermore, since the carbon material has high electron-conductivity, the carbon material acts as a path through which electrons run in the above-mentioned Reactions 1 and 2.

Since a membrane electorolyte used in PEFC is acidic (pH is 0 to 3), a material of which electrodes in PEFC are composed is used in acidic atmosphere. While a fuel cell normally works, a cell voltage is in the range of 0.4 to 1.0 V. FIG. 11 is the Pourbaix diagram illustrating a relation between a voltage and pH in a carbon-water ($C-H_2O$) system. Illustrating situations of a cathode and an anode of PEFC working under the above-mentioned conditions, it is understood that they are in an area in which carbon acting as a support in a cathode is decomposed as carbon dioxide ($CO_2$). Accordingly, as reported in the non-patent reference 1, there occurs in a cathode a reaction in which a carbon material used as a support is electrochemically oxidized or decomposed into $CO_2$.

$C + 2H_2O \rightarrow CO_2 + 4H^+ + 4e^-$ (Reaction 3)

Not only in a cathode, but also in an anode, if fuel gas became in short at an initial stage of operation, there would occur reduction in a voltage and/or polarization in a concentration, resulting in that a voltage locally turns to a voltage which is opposite to a normal voltage, and there occurs electrochemical oxidation decomposition reaction in carbon.

Electrochemical oxidation of a carbon support is a problem in particular when PEFC is driven for a long time. Specifically, the noble metal particles on carbon supports are fallen due to oxidative decomposition of carbon supports. As a result, the electrode performance is degraded.

Further, due to local reaction heat brought by oxidation reaction of carbon, a polymer membrane electorolyte is molten to break with the result of occurrence of cross-leakage. Furthermore, if the local reaction heat spreads there around, an entire stack of a fuel cell might be burned. Thus, it is desired to develop a material of which an electrode used for a fuel cell is composed, which is stable under conditions in which a fuel cell is driven, and including supports composed of a non-carbon material having sufficient electrode performances.

The related art, L. M. Roen et al., "Electrocatalytic Corrosion of Carbon Support in PEMFC Cathodes", Electrochemical and Solid-State Letters, 2004, Vol. 7(1), A19-A22, discloses a material of which an electrode used for a fuel cell is composed, comprising supports composed of electrically conductive metal oxide in place of a carbon material, and noble metal catalyst is loaded on the supports. Specifically, the related art discloses in the embodiment thereof that even after a cycle of driving and stopping a fuel cell were repeated 500 times under general conditions for driving a fuel cell in a fuel cell (PEFC) including electrodes composed of a material comprising supports composed of electrically conductive metal oxide such as tin-doped indium oxide, and Pt particles loaded on the supports at about 50 mass %, a cell voltage was hardly degrated.

In the material disclosed in the related art, "Electrocatalytic Corrosion of Carbon Support in PEMFC Cathodes", Pt is loaded on surfaces of powders of electrically conductive oxide by dispersing powders of the above-mentioned electrically conductive oxide in an aqueous solution of chloroplatinic acid, and adding sodium citrate as a reducing agent thereinto for reflux. Though the related art describes that Pt particles having a small diameter and having high dispersity ability are formed on surfaces of powders composed of electrically conductive oxide, the disclosed material cannot provide performances satisfied as a fuel cell electrode.

In view of the above-mentioned current state, it is an object of the present invention to provide a method of producing a material of which an electrode used for a fuel cell is composed, which includes supports composed of electrically conductive oxide support and having excellent electrochemical catalytic activity, and high durability

SUMMARY OF THE INVENTION

In view of the above-mentioned problem, the inventors had considered and researched that electrochemical catalytic activity can be enhanced by subjecting both noble metal acting as catalyst and electrically conductive oxide acting as a support by conducting suitable activation treatment. As a result, the inventors had discovered that it was possible to produce a material of which an electrode used for a fuel cell is composed, which could present excellent electrochemical catalytic activity even if an amount of used noble metal were small, by subjecting supports principally composed of tin oxide on which reduced noble metal colloid were loaded, to a heat treatment in the presence of a reducing gas at a temperature equal to or higher than 80 degrees centigrade, but equal to or lower than 250 degrees centigrade, and had reached the present invention.

Specifically, the present invention presents the following <1> to <11>.

<1> A method of producing a material of which an electrode used for a fuel cell is composed, comprising the steps of:

(1) dispersing supports principally composed of tin oxide in a solution containing therein noble metal colloid, and reducing the noble metal colloid so as to be loaded on the supports as noble metal particles;

(2) separating liquid from the supports on which the noble metal particles are loaded, and drying the supports; and (3) subjecting the dried supports on which the noble metal particles are loaded, to a heat treatment in the presence of a reducing gas at a temperature equal to or higher than 80 degrees centigrade, but equal to or lower than 250 degrees centigrade.

<2> The method as set forth in <1>, wherein the tin oxide is niobium-doped tin oxide.

<3> The method as set forth in <1>, wherein the tin oxide is produced by ammonia coprecipitation.

<4> The method as set forth in <1>, wherein the noble metal is platinum or alloy containing platinum.

<5> The method as set forth in <1>, wherein the noble metal is loaded in the range of 10 to 30 weight % both inclusive.

<6> The method as set forth in <1>, wherein the reducing gas is hydrogen.

<7> The method as set forth in <6>, wherein the hydrogen is diluted with inert gas in the range of 0.1 to 50% both inclusive, and contains water vapor in the range of 0.5 to 50% both inclusive.

<8> A material of which an electrode used for a fuel cell is composed, comprising supports principally composed of tin oxide, and noble metal particles loaded on the supports, the material being produced by the method as set forth in any one of <1> to <7>.

<9> A material of which an electrode used for a fuel cell is composed, comprising supports principally composed of niobium-doped tin oxide, and noble metal particles loaded on the supports.

<10> A fuel cell including an electrode on one of surfaces of a membrane electorolyte as a cathode, the electrode being composed of the material as set forth in <8>, and a material having proton conductivity.

<11> A fuel cell including an electrode on one of surfaces of a membrane electorolyte as a cathode, the electrode being composed of the material as set forth in <9>, and a material having proton conductivity.

The advantages obtained by the aforementioned present invention will be described hereinbelow.

The method in accordance with the present invention provides a material of which an electrode used for a fuel cell is composed, which includes non-carbon supports, and which has excellent durability ensuring that the electrode is not decomposed by oxidation unlike conventional carbon material, even if used as a cathode. The above-mentioned material accomplishes an electrode used for a fuel cell having high electrochemical catalytic activity and presenting excellent performance in generation of electric power.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Figure 1:
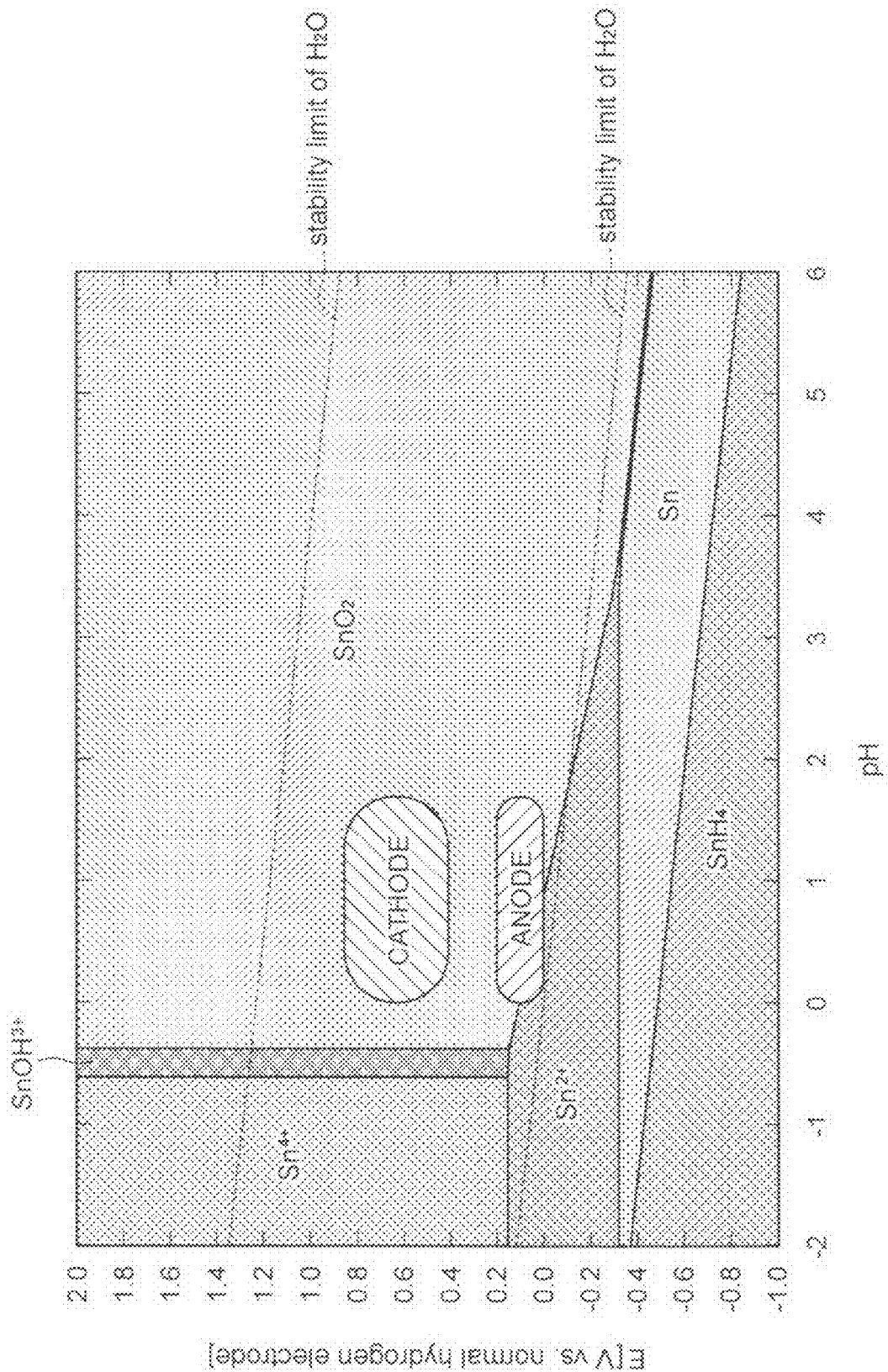
FIG. 1 is a diagram (Pourbaix diagram) showing a relation between pH and a potential in Sn—$H_2O$ system.

The present invention is explained hereinbelow in detail.

The present invention relates to a method of producing a material of which an electrode used for a fuel cell is composed, comprising the steps of:

(1) dispersing supports principally composed of tin oxide in a solution containing therein noble metal colloid, and reducing the noble metal colloid so as to be loaded on the supports as noble metal particles;

(2) separating liquid from the supports on which the noble metal particles are loaded, and drying the supports; and (3) subjecting the dried supports on which the noble metal particles are loaded, to a heat treatment in the presence of a reducing gas at a temperature equal to or higher than 80 degrees centigrade, but equal to or lower than 250 degrees centigrade.

In the present invention, "supports principally composed of tin oxide" indicate "particles of tin oxide ($SnO_2$)", "particles of tin oxide ($SnO_2$) into which another element is doped", or agglomerate of those particles, and in particular, indicate those particles or agglomerate containing tin oxide at 80 mol % or greater.

The present invention is characterized in that noble metal colloid is reduced to thereby be adhered as noble metal particles around supports principally composed of tin oxide (hereinafter, referred also to "tin oxide supports"), and then, the supports are subjected to a heat treatment in the presence of a reducing gas at a temperature equal to or higher than 80 degree centigrade, but equal to or lower than 250 degrees centigrade.

Noble metal particles having been reduced in liquid phase through noble metal colloid contains a lot of nonstoichiometric noble metal oxides. Accordingly, it is possible to activate electrochemical catalytic activity of noble metal catalyst by subjecting the noble metal particles to a heat treatment in a reducing gas. It is further possible to obtain a material of which an electrode used for a fuel cell is composed, which has both excellent electrochemical catalytic activity of noble metal particles and durability of tin oxide supports, by carrying out the heat treatment at a temperature equal to or higher than 80 degree centigrade, but equal to or lower than 250 degrees centigrade (preferably, a temperature equal to or higher than 100 degree centigrade, but equal to or lower than 200 degrees centigrade).

Hereinbelow is explained in detail each of the steps in the method in accordance with the present invention. Hereinafter, the steps (1) and (2) may be called "colloid process". Specifically, "colloid process" indicates a method in which noble metal precursor is reduced through the use of a reducing agent or a reducing solvent in a solution in which tin oxide supports are dispersed, to thereby produce noble metal colloid, which is then loaded on the supports, and then, the noble metal colloid and the supports are dried, thereby loading the dried noble metal particles on surfaces of the supports. The colloid process makes it possible to load noble metal particles having a nano-sized diameter distribution on supports in highly dispersed condition without using surfactant agent or organic solvent.

First, the step (1) is explained. In the step (1), supports principally composed of tin oxide is dispersed in a solution containing therein noble metal colloid, and then, the noble metal colloid is reduced so as to be loaded on the supports as noble metal particles. Conditions for producing a solution containing therein noble metal colloid is not to be limited to specific conditions, and there may be selected any conditions suitable to the selected noble metal precursor and reducing agent. Furthermore, tin oxide particles to be dispersed in a solution containing therein noble metal colloid may be in powder condition or be dispersed in water or ethyl alcohol, in which the latter is preferable, because a uniform solution can be surely produced.

As a reducing agent, there may be used sodium hydrogen sulfite ($NaHSO_3$), sodium borohydride, sodium triethylborohydride, hydrogen peroxide, hydrazine, and so on. They may be used singly or in combination. In addition, after carrying out reduction through the use of a certain reducing agent, reduction through the use of another reducing agent may be carried out. By carrying out multi-stage reduction in a liquid phase, it is possible to load noble metal particles on supports in a highly dispersed condition. In a preferable example, $NaHSO_3$ and hydrogen peroxide both as a reducing agent are used in this order.

The solution may have pH in the range of 1 to 10, but it is preferable that the soultion has pH in the range of 4 to 6. Selecting this pH range, it is possible to produce colloid solution in which noble metal colloid is uniformly dispersed without aggregation.

A preferable temperature range is 20 to 100 degrees centigrade (a more preferable range is 50 to 70 degrees centigrade). If a reduction temperature in the colloid process is lower than 20 degrees centigrade, noble metal precursor may not be sufficiently reduced. If the reduction temperature is higher than 100 degrees centigrade, a solution is boiled with the result of deterioration in dispersion of produced noble metal particles. Furthermore, if noble metal colloid were caused to make contact with a reducing agent for a long time, produced noble metal particles would have an increased diameter. Thus, a time in which noble metal colloid makes contact with a reducing agent is generally in the range of about 10 minutes to about 2 hours.

Noble metal to be preferably used in the method in accordance with the present invention is not to be limited to specific one, if it has electrochemical catalytic activity to reduction of oxygen (and oxidation of hydrogen). Known noble metals may be used. Specifically, noble metal catalyst may be selected from noble metals such as Pt, Ru, Ir, Pd, Rh, Os, Au and Ag, or alloys containing at least one of those noble metals. Herein, "alloys containing a noble metal" covers "alloys composed only of the above-mentioned noble metals" and "alloys containing one or more of the above-mentioned noble metals at 10 mass % or greater, and another metal". The above-mentioned "another metal" to be contained in an alloy together with a noble metal is not to be limited to specific one. Preferable examples of "another metal" are Co, Fe, W, Ta, Nb and Sn, which may be used singly or in combination. As an alternative, two or more among the above-mentioned noble metals and alloys containing a noble metal may be used in a split phase. Among these noble metal catalyst, Pt and an alloy containing Pt therein has high electrochemical catalytic activity to reduction of oxygen (and oxidation of hydrogen) at around 80 degrees centigrade at which a polymer electrolyte fuel cell operates, and hence, are preferably used.

Precursor of a noble metal is not to be limited to a specific one, but any precursor may be selected if it is soluble in water or lower alcohol such as methanol and ethanol all of which are preferably used as a solvent.

Specifically, halogenide, nitrate, sulfate, oxalate or acetate as a noble metal precursor may be used.

Tin oxide supports as electrically conductive material in the material of which an electrode used for a fuel cell in accordance with the present invention have sufficient electron conductivity, and are able to carry noble metal particles thereon in highly dispersed conditions. Furthermore, as illustrated in FIG. 1, which is a diagram (Pourbaix diagram) showing a relation between pH and a potential in Sn—$H_2O$ system, with respect to tin (Sn), oxide thereof, that is, $SnO_2$ is thermodynamically stable in an area in which it is used as a cathode, and hence, is not decomposed by oxidation.

A size and a shape of the tin oxide supports are determined so as to ensure a space in which tin oxide supports situated adjacent to each other can continuously make contact with each other, and gases existing in fuel cell electrodes, such as hydrogen and oxygen, can be smoothly diffused and water (water vapor) existing in fuel cell electrodes can be smoothly exhausted. That is, tin oxide supports may have various shapes such as particle shape and fiber shape. In many cases, tin oxide supports are formed particle-shaped, because tin oxide supports can be readily so formed. Specifically, tin oxide supports may be comprised of secondary particles which has an average particle diameter in the range of 0.1 to 5 micrometers (preferably, in the range of 0.3 to 1 micrometers), and is formed by aggregation of primary particles having an average particle diameter in the range of 10 to 500 nanometers (preferably, in the range of 20 to 100 nanometers).

As mentioned above, the tin oxide supports cover tin oxide ($SnO_2$) into which other element or elements is (are) doped. For instance, Sb, Nb, Ta, W, In, V, Cr, Mn and/or Mo may be doped. There is preferably used Sb, Nb, Ta, W or In from the standpoint of enhancement of electron conductivity. Among them, niobium-doped tin oxide into which Nb is doped at 0.1 to 20 mol % is in particular preferably used. Though the reason is not obvious, it is estimated that niobium-doped tin oxide has excellent electron conductivity, and electronic interaction is generated between niobium-doped tin oxide and noble metal particles loaded on the niobium-doped tin oxide.

In addition, as long as the object and the advantages of the present invention are maintained, the tin oxide supports may contain electrically conductive material or materials such as other electrically conductive metal oxide and carbon.

In the method in accordance with the present invention, there may be used tin oxide supports produced by conventional methods. Specifically, a method of thermally oxidizing metal tin powders, a method of thermally decomposing metastannic acid produced by dissolving tin metal into an acidic solution, or a method of producing tin oxide supports by hydrolyzing tin alkoxide may be used for producing tin oxide supports. It is particularly preferable to produce tin oxide supports by ammonia coprecipitation. Ammonia coprecipitation has a step of adding ammonia to an acidic solution containing tin precursor. Ammonia coprecipitation makes it possible to produce tin oxide having a uniform particle diameter. Furthermore, though the reason is not known, activity of noble metals loaded on tin oxide produced by ammonia coprecipitation is enhanced in comparison with tin oxides produced by other methods. Tin precursor to be used in ammonia coprecipitation is not to be limited to a specific one. For instance, there may be used sulfate, oxynitrate, oxysulfate, acetate, chloride, ammonium complex, phosphate, carboxylate of tin.

Since tin oxide produced by ammonia coprecipitation contains an amorphous portion, it is possible to have tin oxide particles having high crystallity by drying and calcining.

A method of drying tin oxide is not to be limited to a specific one. The above-mentioned solvent such as water and ethanol may be vaporized by subjecting to a heat treatment, reduction in pressure, or naturally drying. An atmosphere in which tin oxide is dried is not to be limited to a specific one. For instance, there may be arbitrarily selected atmospheric conditions from an oxidizing atmosphere or atmospheric air both including oxygen, an inert atmosphere including nitrogen and/or argon, a reducing atmosphere including hydrogen, and so on. In general, atmospheric air is selected.

By calcining dried tin oxide in an oxidizing atmosphere or atmospheric air both including oxygen at a temperature in the range of 300 to 800 degrees centigrade, preferably 400 to 700 degrees centigrade, and more preferably 450 to 650 degrees centigrade, it is possible to obtain tin oxide having high crystallity and high electron conductivity. If dried tin oxide were calcined at a temperature lower than 300 degrees centigrade, the obtained tin oxide would have low crystallity and would not have sufficient electron conductivity, and if dried tin oxide were calcined at a temperature higher than 800 degrees centigrade, tin oxide particles would be aggregated, resulting in a problem that a surface area thereof is too small.

Hereinbelow is explained the step (2). In the step (2), liquid is separated from the supports on which the noble metal particles are loaded in the step (1), and then, the supports are dried.

A method of separating liquid is not to be limited to a specific one. A method including steps of removing most of liquid by, for instance, filtration or centrifugal separation, and vaporizing water to thereby dry supports is in general selected. A method of drying supports may comprise heating, drying in a reduced pressure, or naturally drying, if tin oxide supports on which dried noble metal particles are loaded could be obtained.

An atmosphere in which the supports are dried is not to be limited to a specific one. For instance, there may be arbitrarily selected atmospheric conditions from an oxidizing atmosphere or atmospheric air both including oxygen, an inert atmosphere including nitrogen and/or argon, a reducing atmosphere including hydrogen, and so on. In general, atmospheric air is selected.

A temperature at which the supports are dried is not to be limited to a specific temperature. If the supports were dried at a temperature equal to or higher than 150 degrees centigrade, oxidation of noble metal catalyst might progress. Accordingly, the supports are dried preferably at a temperature lower than 150 degrees centigrade.

Furthermore, by producing noble metal particles in accordance with the colloid process including the above-mentioned steps (1) and (2), it is possible to load noble metal particles having a small particle diameter profile, specifically 5 nanometers or smaller, on tin oxide supports in highly dispersed condition without using surfactant or other organic solvents. As a method of loading noble metal particles on tin oxide supports, there are other methods as an impregnation method. However, they produce metal particles having higher particle diameter and more poor dispersability, and provide a greater particle diameter profile than metal particles produced by the colloid method, and hence, they may not accomplish the object of the present invention.

Hereinbelow is explained the step (3).

In the step (3), the dried supports on which the noble metal particles are loaded are subjected to a heat treatment in the presence of a reducing gas at a temperature equal to or higher than 80 degrees centigrade, but equal to or lower than 250 degrees centigrade.

The noble metal particles loaded on the tin oxide supports are activated in the step (3). Since the noble metal particles having been dried through the step (2) contain a lot of nonstoichiometric noble metal oxide, the noble metal particles have low catalytic activity. Thus, electrochemical catalytic activity is activated in the step (3) by subjecting the dried noble metal particles to a heat treatment in the presence of a reducing gas at a temperature equal to or higher than 80 degrees centigrade, but equal to or lower than 250 degrees centigrade.

A temperature at which the heat treatment is carried out is preferably in the range of 80 to 250 degrees centigrade, and more preferably in the range of 100 to 200 degrees centigrade. If the temperature were lower than 80 degrees centigrade, the catalytic activity would be insufficiently activated, and if the temperature were higher than 250 degrees centigrade, noble metal particles would be much aggregated, resulting in insufficient electrode performance.

As a reducing gas, there may be used hydrogen or carbon monoxide. It is preferable to select hydrogen, because hydrogen is not a poison for the catalytic activity of noble metal particles, and hydrogen is readily available.

In addition, it is preferable that hydrogen is diluted with an inert gas such as helium or argon at 0.1 to 50 volume % (preferably at 1 to 10 volume %), and contains water vapor at 0.5 to 50 volume % (preferably at 1 to 20 volume %). This is because a partial pressure of oxygen in an atmosphere is increased by diluting hydrogen with an inert gas and humidifying hydrogen with water vapor, and hence, it is possible to prevent the tin oxide supports from being reduced too much. If the concentration of an inert gas is smaller than 0.1 volume %, the inert gas might not avoid the reduction of the tin oxide supports, and if the concentration of an inert gas is greater than 50 volume %, the noble metal particles might not be sufficiently activated. If the concentration of water vapor is smaller than 0.5 volume %, the effect of suppression of reducing the tin oxide supports by increase of a partial pressure of oxygen in an atmosphere is too small, and if the concentration of water vapor is greater than 50 volume %, the activation of the noble metal particles might be suppressed, and further water generated by a condensation of water vapor might exert harmful influence on the activation of the noble metal particles.

Hereinbelow is explained a material of which an electrode used for a fuel cell is composed, produced in accordance with the method of the present invention.

In the material of which an electrode used for a fuel cell is composed, produced in accordance with the present invention, the produced noble metal particles are not to be limited to crystal. They may be amorphous, or a combination of crystal and amorphous state.

Since a smaller noble metal catalyst has a greater effective surface area in which electrochemical reaction progresses, a smaller noble metal catalyst can enhance electrochemical catalytic activity to reduction of oxygen (and oxidation of hydrogen). However, if noble metal catalyst were too small in size, the electrochemical catalytic activity would be lowered. Accordingly, a size of noble metal catalyst as an average particle diameter is in the range of 1 to 20 nanometers, preferably 1.5 to 10 nanometers, and more preferably 2 to 5 nanometers. "An average particle diameter of noble metal catalyst" can be obtained based on a crystal diameter calculated in accordance with a width at half maximum of a diffraction peak in noble metal catalyst in X-ray diffraction, or an average of particle diameters of noble metal catalyst measured by electron microscope images.

An amount of noble metal particles to be loaded on the supports is preferably in the range of 1 to 70 mass % to electrically conductive oxide, in which case, excellent catalytic activity per a unit mass can be obtained, and further, desired electrochemical catalytic activity can be obtained in accordance with an amount of noble metal particles. If the amount were smaller than 1 mass %, electrochemical catalytic activity would be insufficient, and if the amount were greater than 70 mass %, noble metal particles would tend to be aggregated, causing a problem that an effective surface area contributing to a reaction is reduced. An amount of noble metal particles can be measured, for instance, by means of inductively coupled plasma emission spectrometry (ICP). The material of which an electrode used for a fuel cell is composed, in accordance with the present invention, is characterized in that sufficient electrode performance can be obtained even if the amount is in the range of 10 to 30 mass %. It is estimated this is because certain electronic interaction occurs between tin oxide as supports and noble metal particles loaded on the supports.

By composing the tin oxide supports of secondary particles formed by agglomeration of primary particles having an average particle diameter in the range of 10 to 500 nanometers, and having an average particle diameter in the range of 0.1 to 5 micrometers, it is possible to have particularly high electron conductivity in a resultant fuel cell electrode. As mentioned above, from the standpoint of enhancement in performance of an electrode, it is more preferable to use niobium-doped tin oxide.

Hereinbelow is explained an electrode composed of the material of which an electrode used for a fuel cell is composed, in accordance with the present invention. Specifically, hereinbelow is explained a case in which an electrode in PEFC is composed of the above-mentioned material.

An electrode used for a fuel cell may be composed only of the above-mentioned material, but generally contains a material (hereinafter, referred to "electrolytic material") used as electrolyte in a fuel cell and having ion conductivity (preferably proton conductivity). The electrolytic material contained in an electrode of a fuel cell together with the material of which an electrode used for a fuel cell is composed may be identical with or may be different from an electrolytic material of which a membrane electorolyte in a fuel cell is composed. From the standpoint of enhancement in adhesion between an electrode and a membrane electorolyte in a fuel cell, it is preferable that the electrolytic material is identical with an electrolytic material of which a membrane electorolyte in a fuel cell is composed.

As the electrolytic material to be used for an electrode and a membrane electorolyte in PEFC, there is an electrolytic material having proton conductivity. This electrolytic material can be grouped into a fluorocarbon electrolytic material containing fluorine atoms in an entirety or a part of polymer skeleton, and a hydrocarbon electrolytic material containing no fluorine atoms in polymer skeleton, and both of them can be used as the electrolytic material.

As a fluorocarbon electrolytic material, for instance, Nafion (registered trademark, commercially available from DuPont), Aciplex (registered trademark, commercially available from Asahi Kasei Kabushikikaisha), or Flemion (registered trademark, commercially available from Asahi Glass Kabushikikaisha) may be preferably used.

As a hydrocarbon electrolytic material, for instance, polysulfonic acid, polystyrenesulfonic acid, polyaryletherketonesulfonic acid, polyphenylsulfonic acid, polybenzimidazolealkylsulfonic acid, or polybenzimidazolealkylphosphonic acid may be preferably used.

A mass ratio between the above-mentioned material and an electrolytic material to be mixed with the above-mentioned material is determined such that sufficient proton conductivity can be obtained in a fuel cell composed of those materials, a gas can be smoothly diffused in an electrode, and water vapor can be smoothly removed out of an electrode. If an electrolytic material were too much mixed with the above-mentioned material, proton conductivity would be enhanced, but gas diffusion would be limited. To the contrary, if an electrolytic material were too little mixed with the above-mentioned material, gas diffusion would be enhanced, but proton conductivity would be limited. Thus, a mass ratio of the electrolytic material to the above-mentioned material is preferably in the range of 10 to 50 mass %. If the mass ratio were smaller than 10 mass %, the electrolytic material having proton conductivity would have poor continuity with the result that it is not possible to ensure proton conductivity sufficient for a fuel cell electrode. To the contrary, if the mass ratio were higher than 50 mass %, the material of which an electrode used for a fuel cell is composed would have poor continuity with the result that it is not possible to ensure electron conductivity sufficient for a fuel cell electrode, and furthermore, gas (oxygen, hydrogen and/or water vapor) diffusion in an electrode may be limited.

Though an electrode used for PEFC has been explained so far as an electrode composed of the material in accordance with the present invention, an electrode composed of the material in accordance with the present invention may be used in various fuel cells such as alkalic fuel cell or phosphoric acid fuel cell other than PEFC. In addition, an electrode composed of the material in accordance with the present invention may be preferably used as an electrode in an apparatus for electrolyzing water, including a high polymer membrane electorolyte used also in PEFC.

Since a fuel cell electrode composed of the material in accordance with the present invention has excellent electrochemical catalytic activity to reduction of oxygen and oxidation of hydrogen, the fuel cell electrode can be used as a cathode and/or an anode. In particular, since the fuel cell electrode has excellent electrochemical catalytic activity to reduction of oxygen shown in the above-mentioned Reaction 2, and an electrically conductive material acting as supports is not electrochemically decomposed by oxidation under conditions in which a fuel cell is operated, the fuel cell electrode is used particularly preferably as a cathode.

Hereinbelow is explained a polymer electrolyte fuel cell including a cathode composed of the material in accordance with the present invention.

Among parts defining a single cell type fuel cell, a gas supplying apparatus, a separator and a current collector may be identical with conventional ones, and hence, they are not explained hereinbelow. Other principal parts of a fuel cell including a cathode composed of the material in accordance with the present embodiment, that is, an anode, a membrane electorolyte, and a membrane-electrode assembly (MEA) defined by an anode, a membrane electorolyte, and a cathode are explained hereinbelow in detail.

Figure 2:
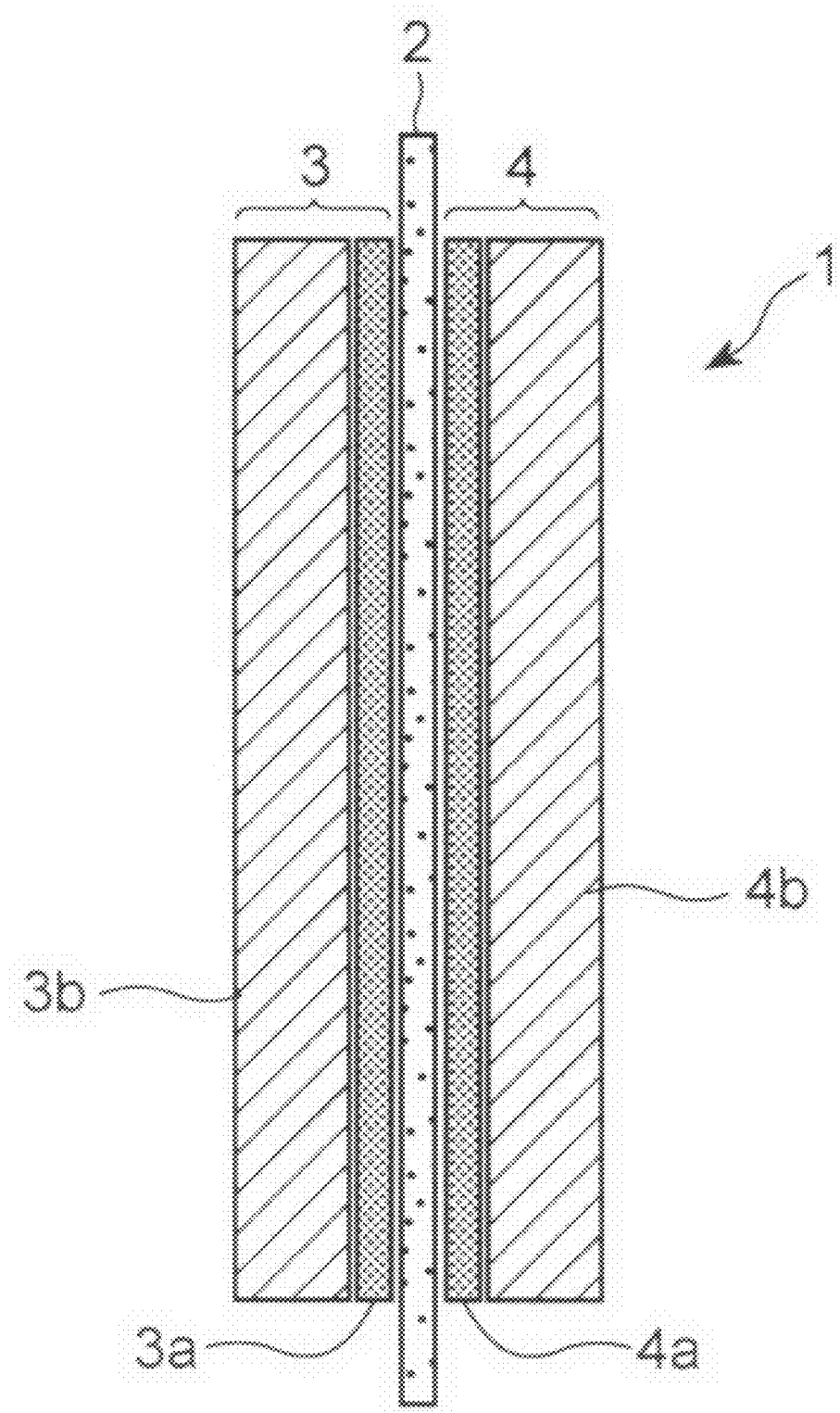
FIG. 2 schematically illustrates a cross-section of MEA including the material of which an electrode used for a fuel cell is composed, in accordance with the present invention.
Figure 3:
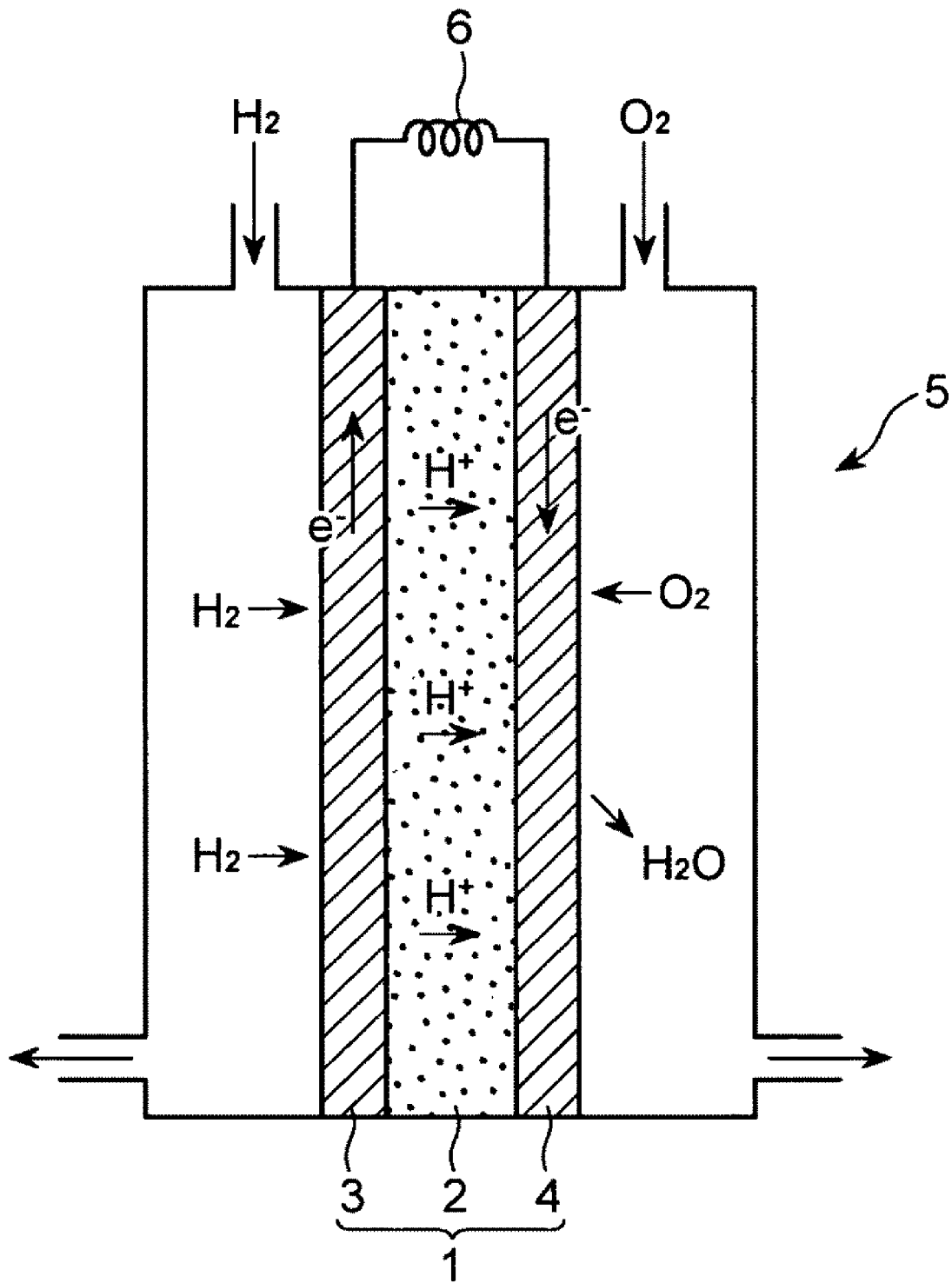
FIG. 3 schematically illustrates a typical structure of a fuel cell including MEA.

FIG. 2 schematically illustrates a cross-section of MEA including the material in accordance with the present invention. As illustrated in FIG. 2, MEA 1 has a structure in which an anode 3 and a cathode 4 face each other with a solid polymer membrane electorolyte 2 being sandwiched therebetween. The anode 3 comprises an anode electrode layer 3a and a gas diffusion layer 3b, and the cathode 4 comprises a cathode electrode layer 4a and a gas diffusion layer 4b. FIG. 3 schematically illustrates a typical structure of a fuel cell including MEA. As illustrated in FIG. 3, hydrogen is supplied to an anode in a (polymer electrolyte) fuel cell 5, and protons (H+) produced in accordance with Reaction 1 ($2H_2 \rightarrow 4H^+ + 4e^-$) are supplied to a cathode through the sold polymer membrane electorolyte 2. Electrons produced in Reaction 1 are supplied to a cathode through an external circuit 6, and react with oxygen in accordance with Reaction 2 ($O_2 + 4H^+ + 4e^- \rightarrow H_2O$) to thereby produce water. A voltage difference between the anode and the cathode is due to electrochemical reactions in the anode and the cathode. Though a thickness is emphasized in FIG. 3, the sold polymer membrane electorolyte 2 generally has a thickness of about 0.05 mm in order to reduce electric resistance thereof.

As an anode, there may be used not only an electrode composed of the material in accordance with the present invention, but also an electrode composed of a conventional material. Specifically, there may be used an electrode comprising electrically conductive supports composed of a carbon material such as graphite, carbon black, activated carbon, carbon nanotube, and glassy carbon, and noble metal catalyst loaded on surfaces of the supports, the noble metal catalyst being selected from noble metals such as Pt, Ru, Ir, Pd, Rh, Os, Au, and Ag, and alloys thereof. "An alloy containing a noble metal" indicates "an alloy composed only of one or more of the above-mentioned noble metals" and "an alloy composed of one or more of the above-mentioned noble metals and a metal other than the above-mentioned noble metals, and containing one or more of the above-mentioned noble metals at 10 mass % or greater". "A metal other than the above-mentioned noble metals" to be mixed with the above-mentioned noble metals is not to be limited to a specific one. For instance, there may be used Co, Fe, W, Ta, Nb or Sn singly or in combination.

A membrane electorolyte in PEFC may be composed of a conventional material, if it has proton conductivity, and has chemical and thermal stability. As an electrolytic material, there may be used the above-mentioned fluorine electrolytic materials and hydrocarbon electrolytic materials. In particular, a membrane electorolyte composed of a fluorine electrolytic material is preferable, because it has excellent resistance to heat and chemical stability. Nafion (registered trademark, commercially available from DuPont), Asyplex (registered trademark, commercially available from Asahi Kasei Kabushikikaisha), or Flemion (registered trademark, commercially available from Asahi Glass Kabushikikaisha) are preferably used. These fluorine electrolytic materials are preferably used as an electrolyte in a polymer electrolyte fuel cell. As a membrane electorolyte, there may be selected inorganic proton conductive materials such as phosphate and sulfate.

A method of assembling a fuel cell is not to be limited to the above-mentioned method. A fuel cell may be assembled in accordance with a conventional method. Though a single cell as a basic structure of a fuel cell has been explained as an example, a plurality of single cells may be stacked one on another, and a fuel cell system may be designed to include the stacked cells. Furthermore, a fuel is not to be limited to hydrogen. There may be used a combination gas of hydrogen and other fuels, or alcohol such as methanol or ethanol.

EXAMPLES

Hereinbelow are explained examples in accordance with the present invention. In the examples, a fuel cell comprises a membrane electorolyte composed of Nafion, a cathode containing Pt/SnO$_2$, and an anode containing carbon particles on which Pt particles are loaded (hereinafter, referred to as "Pt/C").

The material of which a fuel cell electrode is composed was produced in accordance with the following steps.

Example 1

Tin chloride hydrate (SnCl$_2$.2H$_2$O, 2.98 g) was dissolved into pure water (4.5 mL), and dropped into 6%-diluted aqueous ammonia. After dropping tin chloride hydrate, the resultant solution was stirred, filtrated, cleaned, and dried (100 degrees centigrade, 24 hours). Then, the resultant was subjected to a heat treatment at 600 degrees centigrade for 2 hours in an air atmosphere to thereby produce SnO$_2$ particles. Thus obtained SnO$_2$ particles had an average particle diameter (secondary particles) of about 1.0 micrometer.

Pt was loaded on the SnO$_2$ particles in accordance with the colloid process. An amount of reagent was determined such that an amount of the loaded Pt was 20 wt %. First, H$_2$PtCl$_6$ of 1 g was dissolved into distilled water of 100 mL, and then, was reduced with NaHSO$_3$ of 2 g. Then, the resultant was mixed at about 40 degrees centigrade with SnO$_2$ particles (1.484 g) dispersed in distilled water of 800 mL. Adding NaOH aq into the resultant, 35% peroxide (45 mL) was dropped into the resultant with pH being kept at about 5 to thereby cause colloidal Pt oxide to load on the SnO$_2$ particles. The resultant slurry was filtrated, dried, and subjected to reduction at 100 degrees centigrade for 2 hours in a 5% H$_2$/N$_2$ atmosphere containing water vapor saturated at 25 degrees centigrade (hereinafter, referred to as "hydrogen reduction process"), to thereby obtain the material of which a fuel cell electrode is composed, in accordance with Example 1.

Example 2

In the method of producing the material in Example 1, a temperature at which the reduction process was carried out in a 5% $H_2/N_2$ atmosphere containing water vapor saturated at 25 degrees centigrade was changed to 150 degrees centigrade. Similarly to Example 1 except the temperature, there was obtained a material of which a fuel cell electrode is composed, in accordance with Example 2.

Example 3

In the method of producing the material in Example 1, a temperature at which the reduction process was carried out in a 5% $H_2/N_2$ atmosphere containing water vapor saturated at 25 degrees centigrade was changed to 200 degrees centigrade. Similarly to Example 1 except the temperature, there was obtained a material of which a fuel cell electrode is composed, in accordance with Example 3.

Example 4

In the method of producing the material in Example 1, a temperature at which the reduction process was carried out in a 5% $H_2/N_2$ atmosphere containing water vapor saturated at 25 degrees centigrade was changed to 250 degrees centigrade. Similarly to Example 1 except the temperature, there was obtained a material of which a fuel cell electrode is composed, in accordance with Example 4.

Example 5

In the production of the $SnO_2$ particles in the method in accordance with Example 1, there was used niobium-doped tin oxide particles produced by adding niobium chloride ($NbCl_5$) thereinto at a ratio of Sn:Nb=95:5 (mol ratio). Similarly to Example 1 except that, there was obtained a material of which a fuel cell electrode is composed, in accordance with Example 5.

Comparative Example 1

In the method of producing the material in Example 1, the reduction process in a 5% $H_2/N_2$ atmosphere containing water vapor saturated at 25 degrees centigrade was not carried out. Similarly to Example 1 except that, there was obtained a material of which a fuel cell electrode is composed, in accordance with Comparative Example 1.

Comparative Example 2

In the method of producing the material in Example 1, a temperature at which the reduction process was carried out in a 5% $H_2/N_2$ atmosphere containing water vapor saturated at 25 degrees centigrade was changed to 50 degrees centigrade. Similarly to Example 1 except the temperature, there was obtained a material of which a fuel cell electrode is composed, in accordance with Comparative Example 2.

Comparative Example 3

In the method of producing the material in Example 1, a temperature at which the reduction process was carried out in a 5% $H_2/N_2$ atmosphere containing water vapor saturated at 25 degrees centigrade was changed to 300 degrees centigrade. Similarly to Example 1 except the temperature, there was obtained a material of which a fuel cell electrode is composed, in accordance with Comparative Example 3.

Comparative Example 4

In place of the $SnO_2$ particles, carbon particles (CABOT, V-XC72, a primary particle diameter: 50 to 100 nanometers, a secondary particle diameter: 0.5 to 2 micrometers) were used. Similarly to Example 1 except that, there was obtained a material of which a fuel cell electrode is composed, and which is composed of Pt/C, in accordance with Comparative Example 4.

"XRD Measurement"

Figure 4:
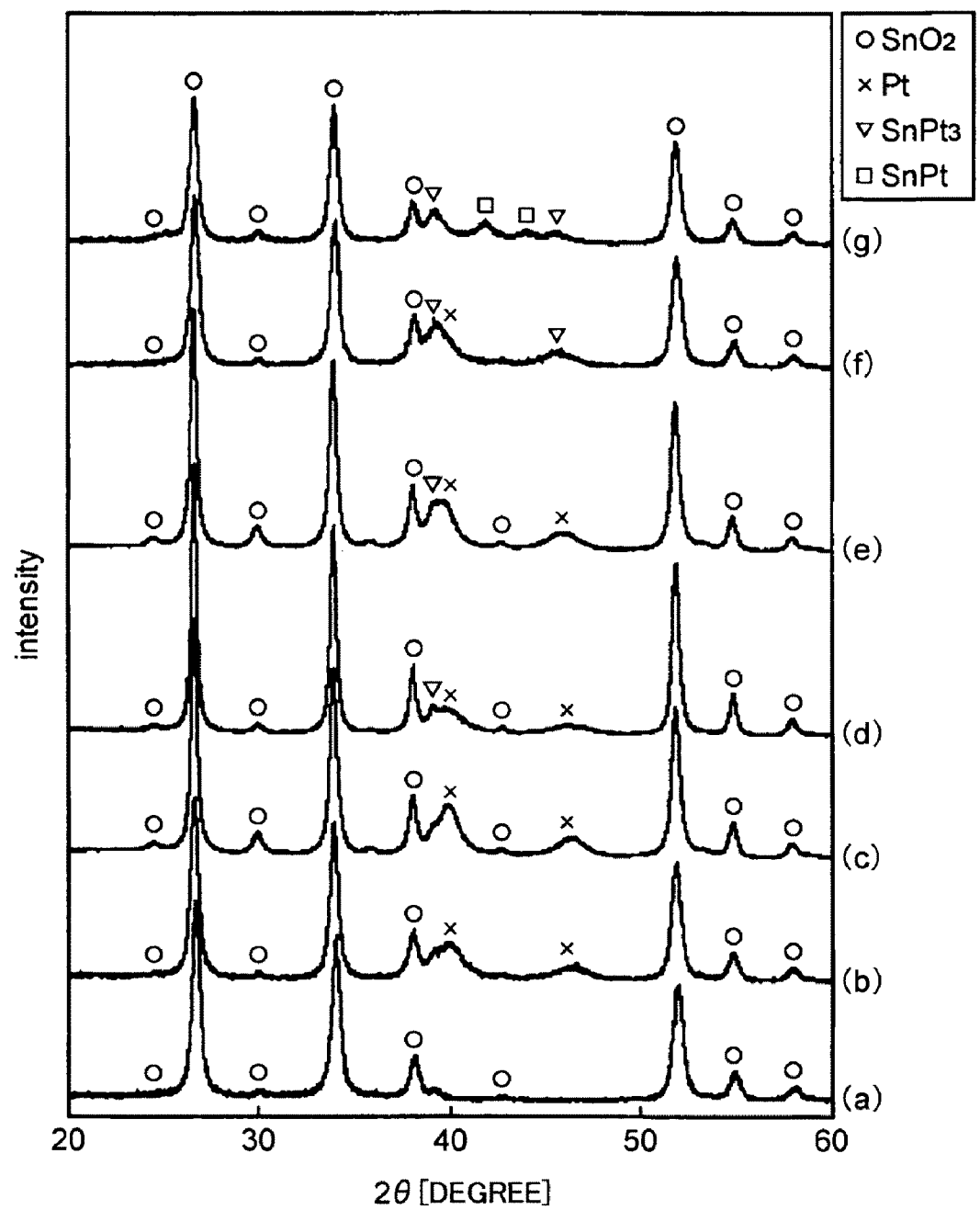
FIG. 4 shows the results of XRD measurement loaded out to the material (Pt/$SnO_2$) of which an electrode used for a fuel cell is composed, in accordance with the present invention.

FIG. 4 shows the results of estimation with respect to crystal phases and crystallity of Examples 1 to 4. The estimation was carried out through the use of the X-ray diffraction apparatus (commercially available from Kabushikikaisha Rigaku, RINT-Ultima III; CuK α 1. 542 angstroms, tube voltage: 40 kV, tube current: 40 mA). In FIG. 4, (a) indicates that the hydrogen reduction process was not carried out (Comparative Example 1), (b) indicates that the hydrogen reduction process was carried out at a temperature of 50 degrees centigrade (Comparative Example 2), (c) indicates that the hydrogen reduction process was carried out at a temperature of 100 degrees centigrade (Example 1), (d) indicates that the hydrogen reduction process was carried out at a temperature of 150 degrees centigrade (Example 2), (e) indicates that the hydrogen reduction process was carried out at a temperature of 200 degrees centigrade (Example 3), (f) indicates that the hydrogen reduction process was carried out at a temperature of 250 degrees centigrade (Example 4), and (g) indicates that the hydrogen reduction process was carried out at a temperature of 300 degrees centigrade (Comparative Example 3).

As illustrated in FIG. 4(a), only $SnO_2$ signals were detected in the example in which the hydrogen reduction process was not carried out. That is, it is considered that Pt produced and loaded on $SnO_2$ particles in accordance with the colloid process is in an amorphous state, or is a fine particle (<1 nanometer) too small to detect by means of XRD, before the hydrogen reduction process is carried out.

In contrast, in FIG. 4(b), signals corresponding to Pt and $SnO_2$ were clearly detected. Thus, it is understood that Pt was turned into particles by carrying out the hydrogen reduction process at a temperature equal to or greater than 50 degrees centigrade. When the hydrogen reduction process was carried out at a temperature greater than 100 degrees centigrade, $PtSn_3$ signals were slightly detected other than Pt signals, and the $PtSn_3$ signals had a higher intensity as the hydrogen reduction process was carried out at a greater temperature. When the hydrogen reduction process was carried out at a temperature of 300 degrees centigrade, PtSn signals were further detected. Average particle diameters of Pt calculated based on a width at half maximum of Pt diffraction peaks in XRD were 6 nanometers or below in each of cases.

"Observation of Microstructure"

Figure 5A:
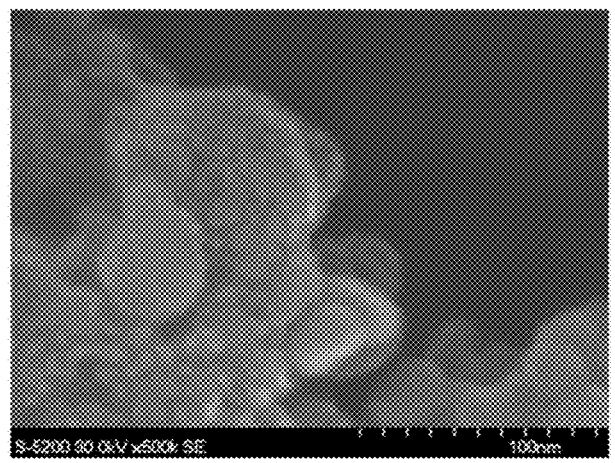
FIG. 5A is a photograph of the material of which an electrode used for a fuel cell is composed, in accordance with the present invention (Example 1), taken by means of a scanning electron microscope (FE-SEM).
Figure 5B:
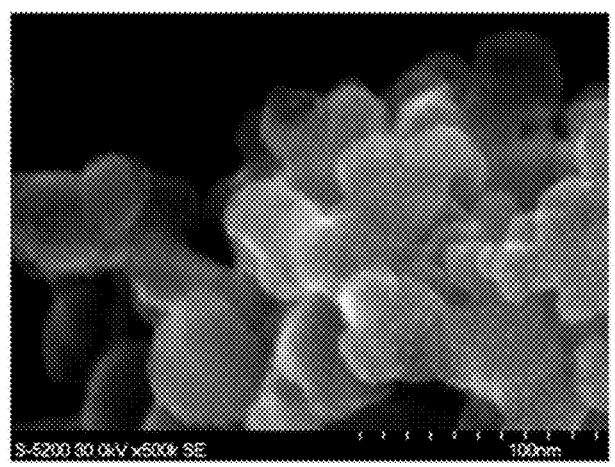
FIG. 5B is a photograph of the material of which an electrode used for a fuel cell is composed, in accordance with the present invention (Example 2), taken by means of a scanning electron microscope (FE-SEM).
Figure 5C:
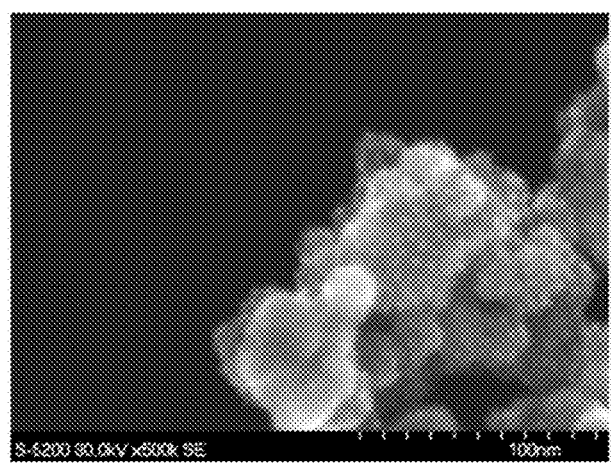
FIG. 5C is a photograph of the material of which an electrode used for a fuel cell is composed, in accordance with the present invention (Example 2, another field of view), taken by means of a scanning electron microscope (FE-SEM).
Figure 6:
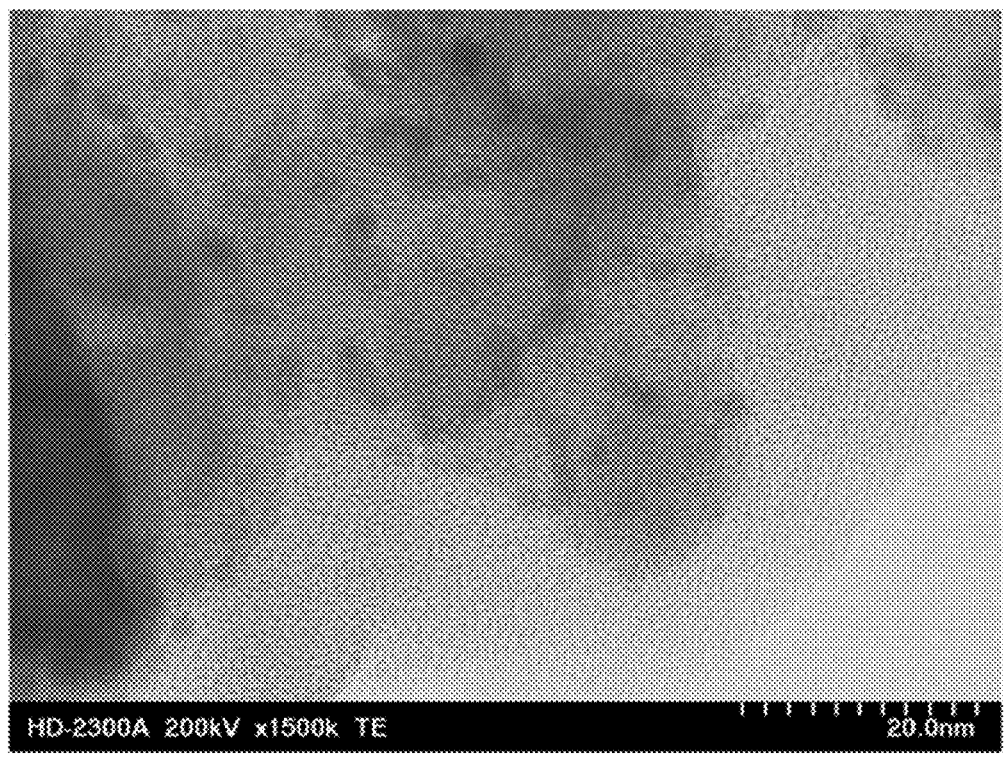
FIG. 6 is a photograph of Pt/$SnO_2$ (Example 1) taken by means of a scanning transmission-type electron microscope.

Examples 1 and 2 were observed by means of a scanning electron microscope (FE-SEM, Hitachi High-Technologies Corporation, S-5200). FIG. 5A shows SEM images of Example 1, and FIGS. 5B and 5C show SEM images of Example 2. FIG. 6 shows the results of observation carried out to Example 1 by means of a scanning and transmission type electron microscope (STEM, Hitachi High-Technologies Corporation, HD-2300A).

It is understood in light of FIGS. 5A to 5C that $SnO_2$ particles having a particle diameter in the range of 10 to 70 nanometers make contact and link with one another, and Pt fine particles having a particle diameter of a few nanometers are loaded on surfaces of the $SnO_2$ particles in both Examples 1 and 2. It was confirmed in the high-resolution STEM images (FIG. 6) that Pt fine particles (indicated by black dots) in Example 1 are almost in about 2 to about 4 nanometers in size, and are loaded on the $SnO_2$ particles in a highly despersed condition without aggregating. Though a part of Pt fine particles in Example 2 is aggregated, as shown in FIG. 5C, most of the Pt fine particles is in a highly dispersed condition, as shown in FIG. 5B.

"Estimation to an Effective Surface Area of Pt"

With respect to Examples 1 to 3 and Comparative Example 2, an effective surface area of the loaded Pt fine particles was estimated by means of a cyclic voltanmetry (CV).

As an electrode for the estimation, there were used electrodes each comprising GC (Glassy Carbon, commercially available from Hokuto Denko Corporation, HR2-D1-GC5) having a diameter of 5 mm on which the materials in accordance with Examples 1 to 3 were coated such that an amount of loaded platinum was 0.05 mg/cm$^2$, and a Nafion film (thickness: about 0.05 mm) formed on the materials.

The CV measurement conditions were as follows. The results of the estimation are shown in Table 1. An effective surface area of Pt was calculated based on an amount of absorbed hydrogen measured by means of CV, on the assumption that a single hydrogen atom is absorbed to a single Pt atom at a surface of the electrode.

Measurement: Three electrode type cell (Action electrode: Example/GC, Counter electrode: Pt, Reference electrode: Ag/AgCl)

Electrolyte: 0.1M $HClO_4$ (pH: about 1)

Range of measured voltages: 0.05-1.1V (vs. normal hydrogen electrode)

Scanning rate: 50 mV/s

Estimation of an amount of absorbed hydrogen: peak area indicative of hydrogen absorption at 0.05 to 0.4V

TABLE 1

| | Temperature at which hydogen reduction is carried out (° C.) | Effective surface area of Pt (m$^2$g$^{-1}$) |
|---|---|---|
| Comparative Example 1 | 50 | 15.1 |
| Example 1 | 100 | 14.5 |
| Example 2 | 150 | 9.0 |
| Example 3 | 200 | 8.9 |

"Estimation to output characteristic of a fuel cell"

Next, fuel cell electrodes were formed through the use of the materials composed of Pt/$SnO_2$, in accordance with Examples 1 and 3, and Comparative Examples 2 and 3, and further, membrane-electrode assemblies (MEA) including the fuel cell electrodes were produced. Output characteristics of them as a fuel cell were estimated. In addition, comparing the supports, there was produced a fuel cell including a cathode composed of Pt/C of Comparative Example 4, and the fuel cell was estimated in the same way.

The cathode was produced in the following steps. Each of the materials of which an electrode is to be composed was dispersed in a predetermined organic solvent containing Nafion solution to thereby prepare a dispersion solution used for forming a cathode. The dispersing solution was coated on the Nafion membrane to thereby dry and remove solvent contained in the dispersing solution, to thereby form a cathode on the Nafion membrane by a predetermined thickness. An amount of the material of which the cathode is composed is determined such that an amount of loaded Pt was 0.6 mg/cm$^2$.

The anode was produced in the following steps. 46 wt % Pt/C (Tanaka Kinzoku Kogyo K. K., TEC10E50E) was dispersed in a predetermined organic solvent containing Nafion solution to thereby prepare a dispersion solution used for forming an anode. The dispersing solution was coated on the Nafion membrane to thereby dry and remove solvent contained in the dispersing solution, to thereby form an anode on the Nafion membrane by a predetermined thickness. An amount of the material of which the anode is composed is determined such that an amount of loaded Pt was 0.4 mg/cm$^2$.

The above-mentioned anode and cathode both formed on the Nafion membrane and acting as a gas diffusion layer were sandwiched between carbon papers, and pressed at a pressure of 10 MPa and at a temperature of 130 degrees centigrade for 3 minutes, to thereby form a membrane-electrode assembly (MEA). The electric power generation test was conducted to the thus formed membrane-electrode assembly under the following test conditions.

An apparatus (made by the inventors) for estimating electric power generation in a single cell, into which MEA formed in accordance with the above-mentioned steps was incorporated, was put in a thermostatic chamber kept at 80 degrees centigrade, and the estimation to electric power generation performance was conducted under the following conditions.

Gas species supplied to the anode: 100% $H_2$

Gas flow rate to the anode: 150 ml/min

Gas species supplied to the cathode: Air

Gas flow rate to the cathode: 150 ml/min

Humidity temperature of supplied gas: 79 degrees centigrade

Figure 7:
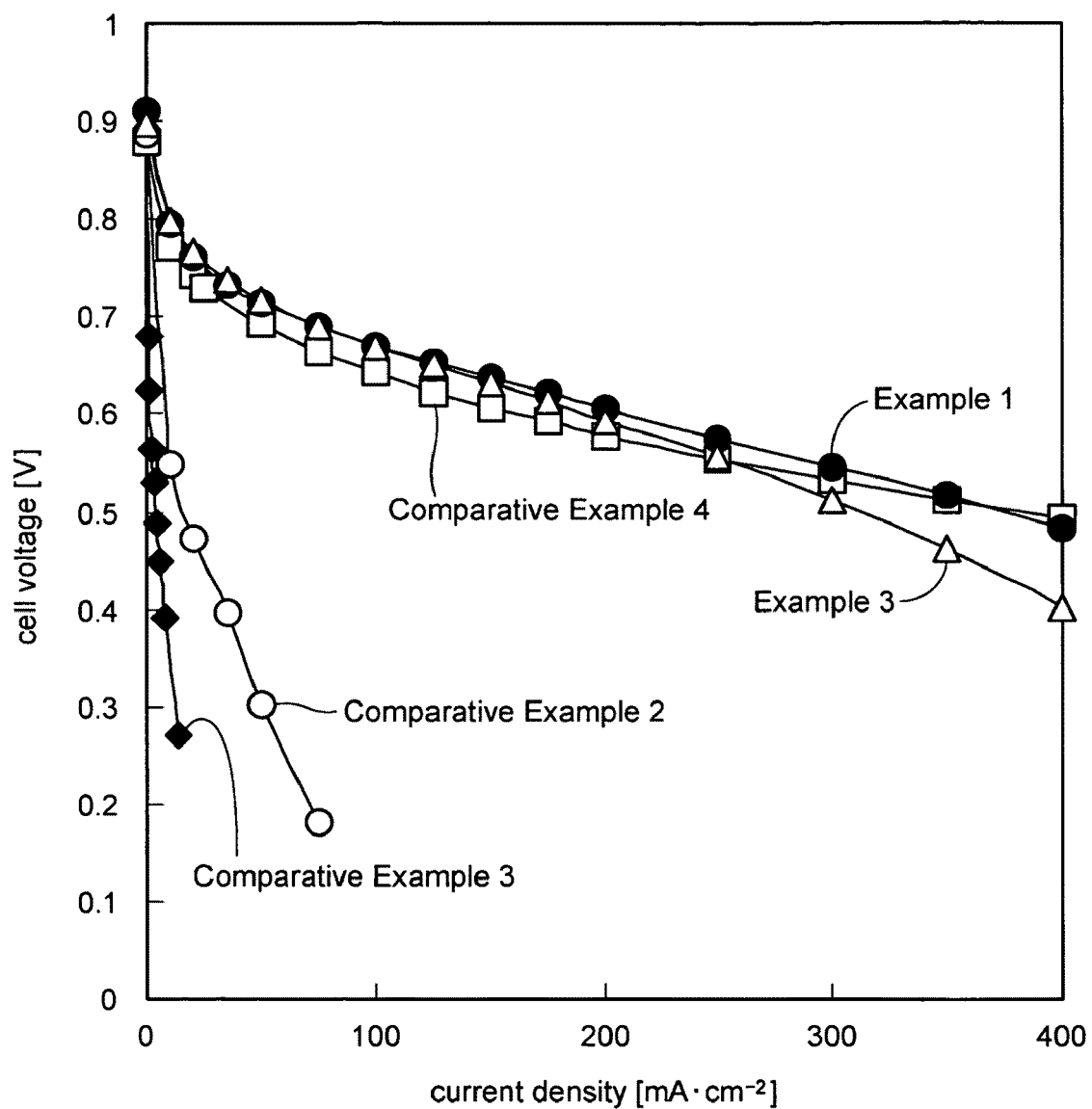
FIG. 7 is a graph showing electric power generation characteristic of a fuel cell including a cathode composed of the material (Pt/$SnO_2$) of which an electrode used for a fuel cell is composed, in accordance with the present invention.

FIG. 7 shows electric power generation characteristic of the fuel cells each including the electrode composed of each of the materials, as a cathode.

Examples 1 and 3 in which the hydrogen reduction process is carried out at a temperature of 100 and 200 degrees centigrade, respectively, exhibits output performance equal to or higher than the conventional Pt/C (Comparative Example 4), and, in particular, with respect to a low current density (lower than 250 mA·cm$^{-2}$), exhibits performance higher than the conventional Pt/C.

In contrast, in Comparative Examples 2 and 3 (Pt/$SnO_2$) in which the hydrogen reduction process is carried out at a temperature of 50 and 300 degrees centigrade, respectively, a cell voltage is much reduced in a field of a low current density. It is estimated this is because of Pt particles are insufficiently activated in Comparative Example 2 in which the hydrogen reduction process is carried out at a temperature of 50 degrees centigrade, and catalytic activity and an electric conductivity of $SnO_2$ are reduced due to generation of alloy phase, PtSn, in Comparative Example 3 in which the hydrogen reduction process is carried out at a temperature of 300 degrees centigrade.

"Estimation of Durability"

The following estimation of durability was conducted to Pt/$SnO_2$ in Example 1. Furthermore, for comparison, the similar test was conducted to Pt/C in Comparative Example 4.

As an acceleration test in the durability estimation, an electrode to be estimated was produced in accordance with the method having been explained in the above-mentioned "Estimation to an effective surface area of Pt", and CV measurement was repeatedly conducted in the following cell structure and conditions (cycle test). The durability was estimated based on a relation between a number of cycles and an effective surface area of Pt. An effective surface area of Pt was calculated based on an amount of absorbed hydrogen, as mentioned above.

Measurement: Three electrode type cell (Working electrode: Example/GC, Counter electrode: Pt, Reference electrode: Ag/AgCl)

Electrolyte: 0.1M $HClO_4$ (pH: about 1)

Range of measured voltages: 0.6-1.3V (vs. normal hydrogen electrode)

Scan rate: 50 mV/s

Figure 8:
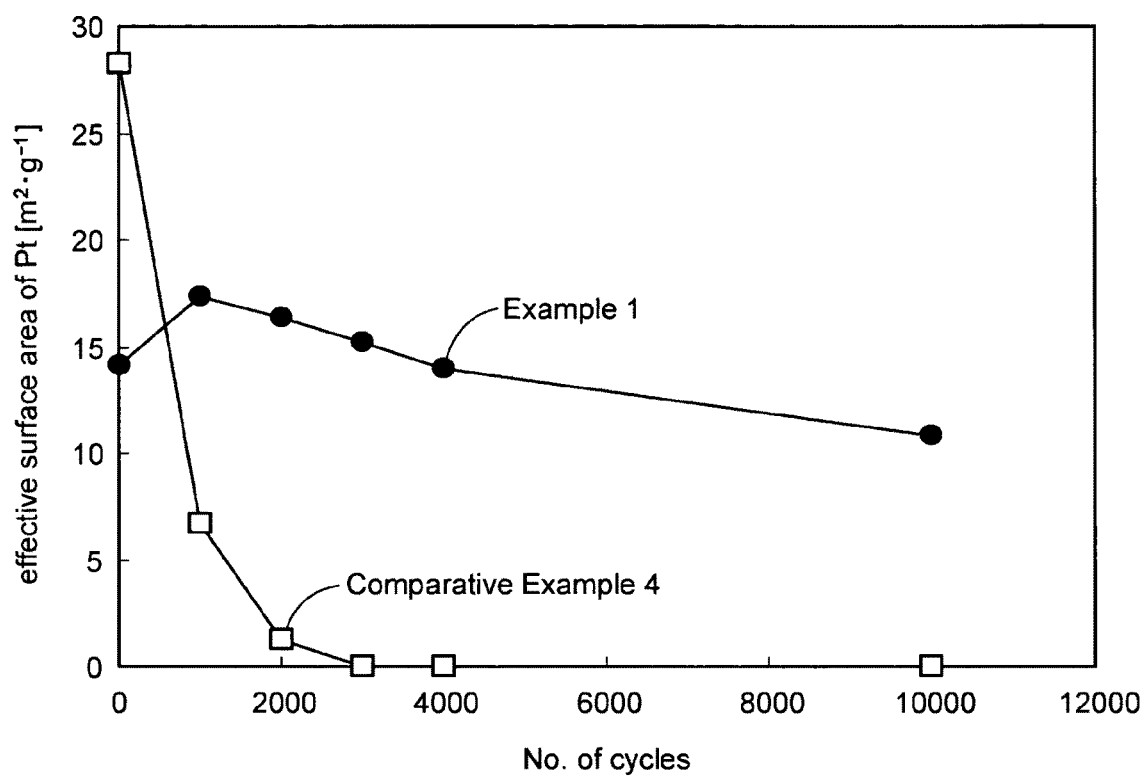
FIG. 8 illustrates the results of the cycle test (estimation of durability) having been carried out to Pt/$SnO_2$ (Example 1) and Pt/C (Comparative Example 4).

Estimation of an amount of absorbed hydrogen: peak area indicative of hydrogen absorption at 0.05 to 0.4V FIG. 8 illustrates the results of the cycle test for Pt/$SnO_2$ (Example 1) and Pt/C (Comparative Example 4). An effective surface area of Pt in initial Pt/$SnO_2$ (Example 1) was about half of that of Pt/C (Comparative Example 4). However, as a number of cycle increased, an effective surface area of Pt in Pt/C (Comparative Example 4) remarkably decreased, and became 10% or smaller of the initial effective surface area at 2000 cycles, and almost zero at 3000 cycles. In contrast, in Pt/$SnO_2$ (Example 1), though an effective surface area of Pt slightly increased and decreased, the effective surface area of Pt was almost equal to the initial effective surface area even after 1000 cycles.

"Examination to Pt/Nb—$SnO_2$ Electrode"

XRD measurement and durability estimation were conducted to Pt/Nb—$SnO_2$ of Example 5. The used apparatuses and test conditions were identical with the above-mentioned ones.

Figure 9:
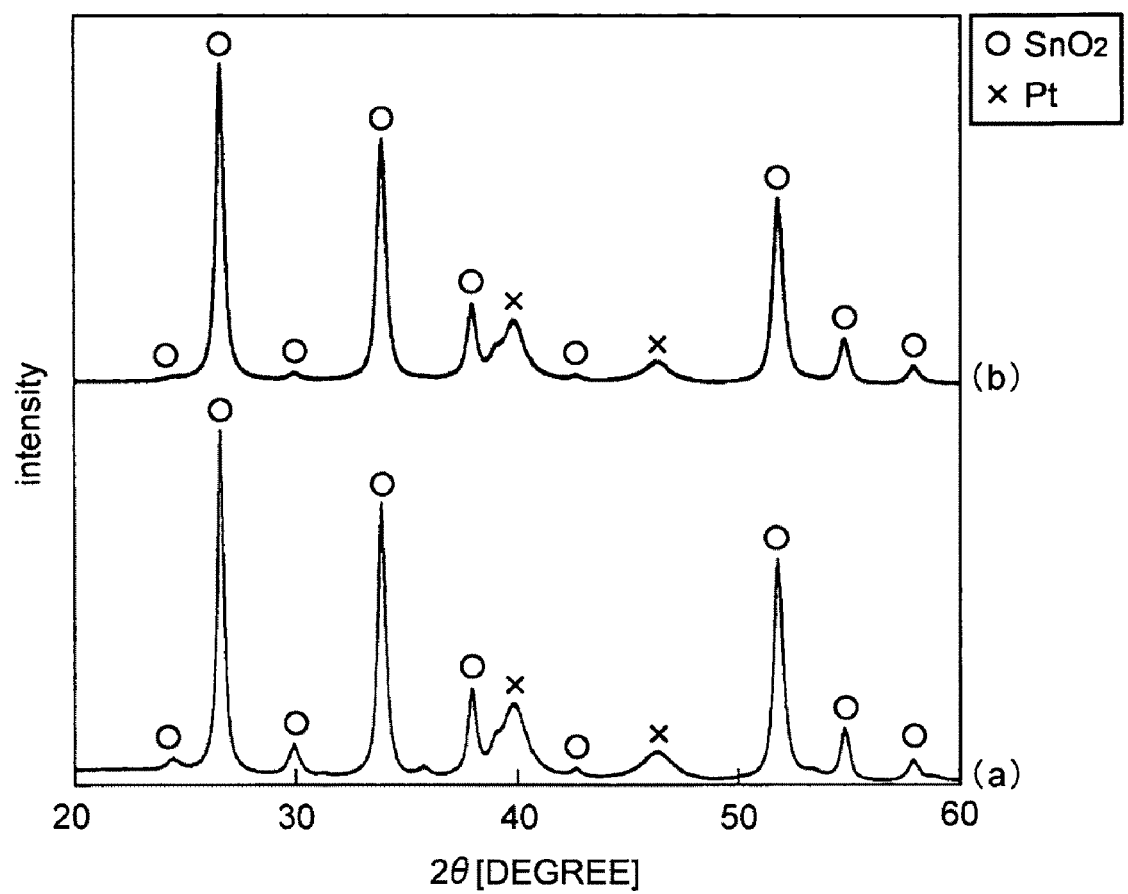
FIG. 9 illustrates the results of XRD measurement carried out to Pt/Nb—$SnO_2$, wherein (a) shows the results for Pt/$SnO_2$ (Example 1) and (b) shows the results for Pt/Nb—$SnO_2$ (Example 5).

FIG. 9 illustrates the results of XRD measurement loaded out to Pt/Nb—$SnO_2$ of Example 5. For comparison, the results of XRD measurement carried out to Pt/$SnO_2$ of Example 1 in which the hydrogen reduction process was carried out at the same temperature as Example 5 were also illustrated in FIG. 9.

Signals of Nb compounds were not detected in the XRD pattern (FIG. 9(b)) of Pt/Nb—$SnO_2$ of Example 5, which is almost identical with the XRD pattern (FIG. 9(a)) of Pt/$SnO_2$ of Example 1. From this result, it was confirmed that added Nb was compounded with $SnO_2$ with the result of the production of niobium-doped tin oxide.

Figure 10:
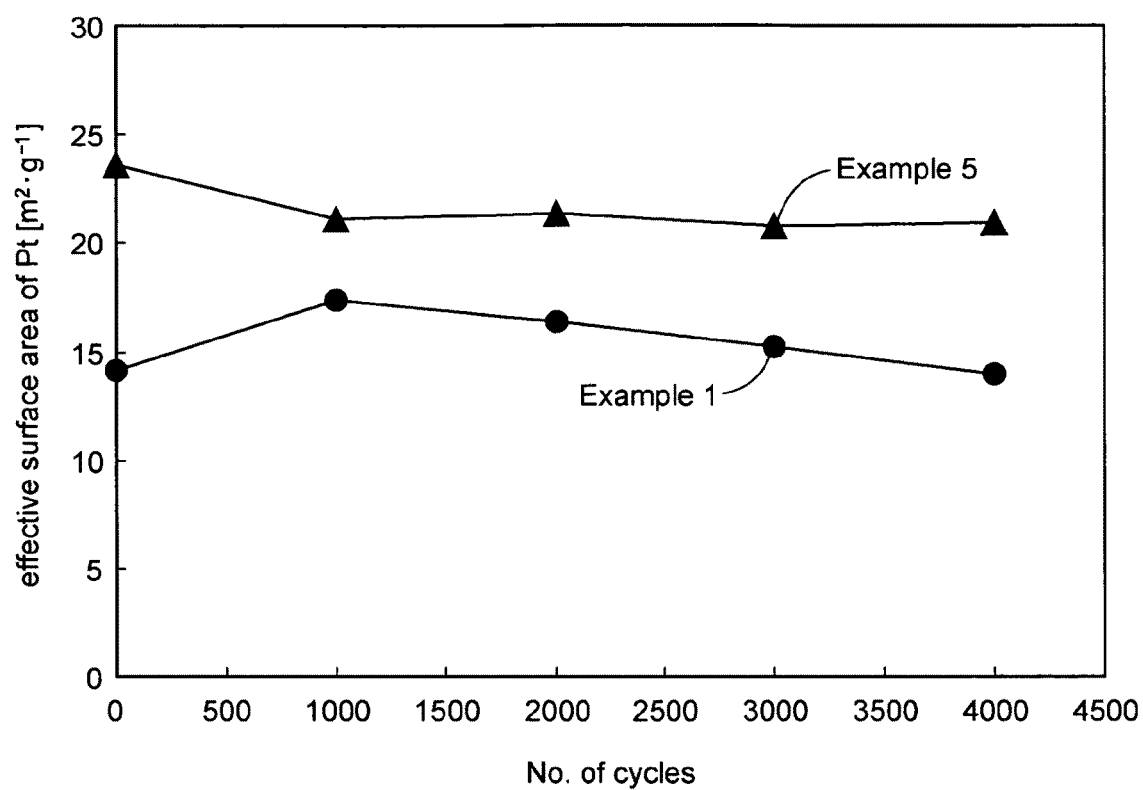
FIG. 10 illustrates the results of the cycle test (estimation of durability) having been carried out to Pt/Nb—$SnO_2$ (Example 5) and Pt/$SnO_2$ (Example 1).
Figure 11:
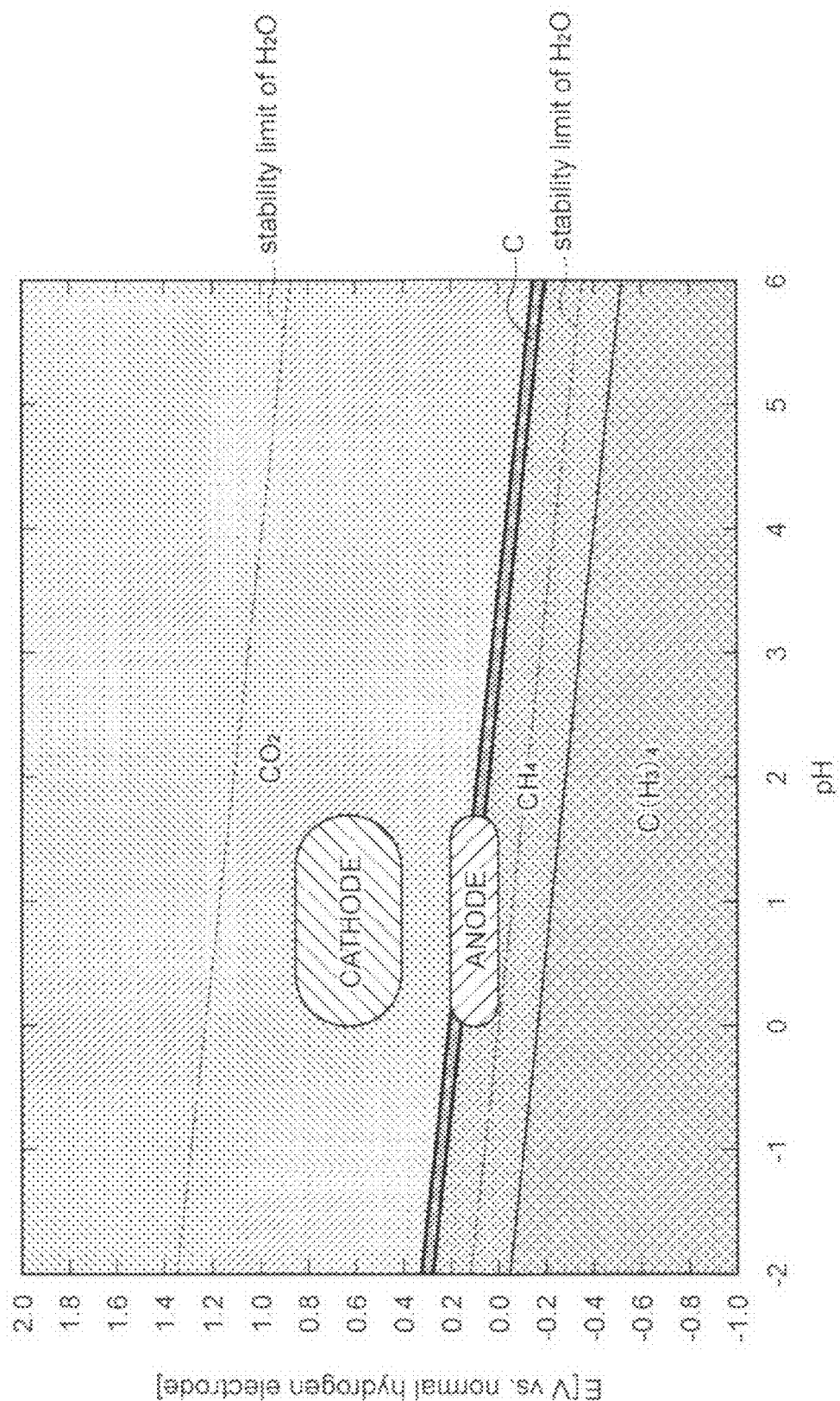
FIG. 11 is a diagram (Pourbaix diagram) showing a relation between pH and a potential in C—$H_2O$ system.

FIG. 10 illustrates the results of the cycle test having been carried out as durability estimation to Pt/Nb—$SnO_2$ (Example 5) and Pt/$SnO_2$ (Example 1). An initial effective surface area of Pt in Pt/Nb—$SnO_2$ (Example 5) was 20.3 $m^2g^{-1}$, which was greater than the same of 14.5 $m^2g^{-1}$ in Pt/$SnO_2$ (Example 1). Furthermore, an effective surface area of Pt in Pt/Nb—$SnO_2$ (Example 5) was not much reduced even after the cycle test was conducted a lot of times, and kept higher than the same in Pt/$SnO_2$ (Example 1).

INDUSTRIAL APPLICABILITY

The material of which a fuel cell electrode is composed, in accordance with the present invention, is in particular suitable to a polymer electrolyte fuel cell which has to run for a long time, as a material used for a fuel cell electrode, containing electrically conductive supports having high stability.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2007-291809 filed on Nov. 9, 2007 including specification, claims, drawings and summary is incorporated herein by reference in its entirety.

The invention claimed is:

1. A method of producing a material of which an electrode used for a fuel cell is composed, comprising the steps of:
    (1) dispersing supports principally composed of niobium-doped tin oxide in a solution containing therein noble metal colloid, and reducing the noble metal colloid so as to be loaded on the supports as noble metal particles;
    (2) separating liquid from the supports on which the noble metal particles are loaded, and drying the supports; and
    (3) subjecting the dried supports on which the noble metal particles are loaded, to a heat treatment in the presence of a reducing gas at a temperature equal to or higher than 80 degrees centigrade, but equal to or lower than 250 degrees centigrade.

2. The method as set forth in claim 1, wherein the noble metal is platinum or alloy containing platinum.

3. The method as set forth in claim 1, wherein the noble metal is loaded in the range of 10 to 30 weight % both inclusive.

4. A method of producing a material of which an electrode used for a fuel cell is composed, comprising the steps of:
    (1) dispersing supports principally composed of tin oxide in a solution containing therein noble metal colloid, and reducing the noble metal colloid so as to be loaded on the supports as noble metal particles;
    (2) separating liquid from the supports on which the noble metal particles are loaded, and drying the supports; and
    (3) subjecting the dried supports on which the noble metal particles are loaded, to a heat treatment in the presence of a reducing gas at a temperature equal to or higher than 80 degrees centigrade, but equal to or lower than 250 degrees centigrade, wherein the reducing gas is hydrogen which is diluted with inert gas in the range of 0.1 to 50% both inclusive, and contains water vapor in the range of 0.5 to 50% both inclusive.

5. The method as set forth in claim 4, wherein the tin oxide is niobium-doped tin oxide.

6. The method as set forth in claim 4, wherein the noble metal is platinum or alloy containing platinum.

7. The method as set forth in claim 4, wherein the noble metal is loaded in the range of 10 to 30 weight % both inclusive.

* * * * *